Feb. 19, 1929.  1,702,757
J. A. ZUBLIN
APPARATUS FOR TRANSFORMING CONTINUOUS ROTATION OF DRILL
COLUMNS INTO RECIPROCATING MOTIONS OF A CUTTER
Filed Sept. 8, 1925    5 Sheets-Sheet 1

INVENTOR:
JOHN A. ZUBLIN,
BY
Ford W. Harris
ATTORNEY.

Feb. 19, 1929.
1,702,757
J. A. ZUBLIN
APPARATUS FOR TRANSFORMING CONTINUOUS ROTATION OF DRILL
COLUMNS INTO RECIPROCATING MOTIONS OF A CUTTER
Filed Sept. 8, 1925    5 Sheets-Sheet 2
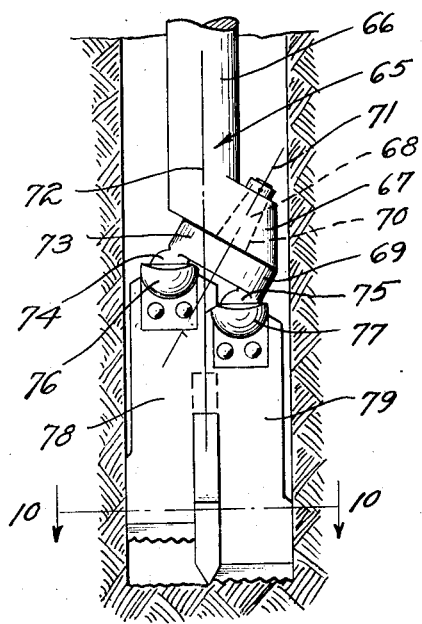
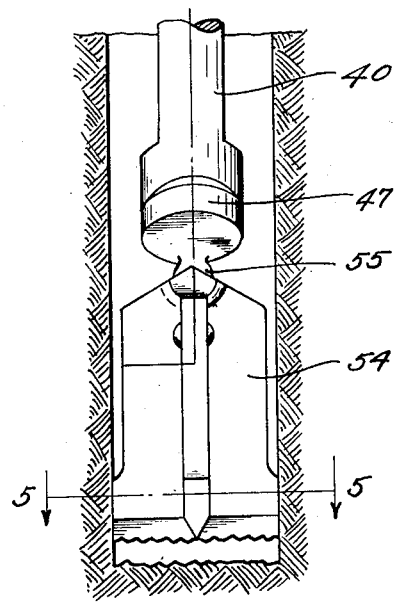
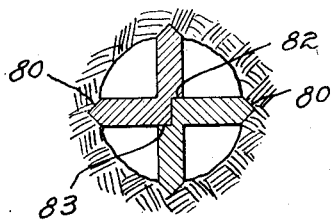
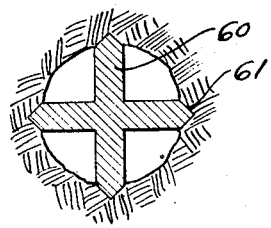
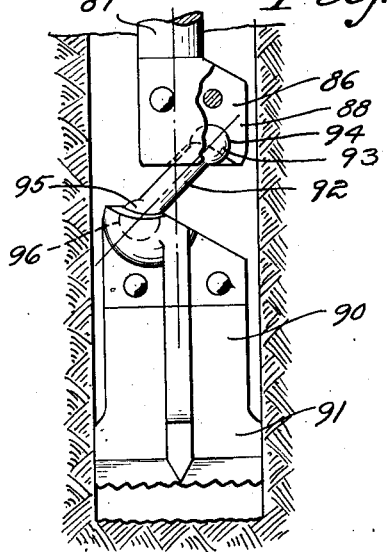
INVENTOR:
JOHN A. ZUBLIN,
By
Ford W. Harris
ATTORNEY.

Feb. 19, 1929.  1,702,757
J. A. ZUBLIN
APPARATUS FOR TRANSFORMING CONTINUOUS ROTATION OF DRILL
COLUMNS INTO RECIPROCATING MOTIONS OF A CUTTER
Filed Sept. 8, 1925   5 Sheets-Sheet 3

INVENTOR:
JOHN A. ZUBLIN,
BY
Fiord W. Harrie
ATTORNEY.

INVENTOR
JOHN A. ZUBLIN.
BY
ATTORNEY.

Feb. 19, 1929.
J. A. ZUBLIN
1,702,757
APPARATUS FOR TRANSFORMING CONTINUOUS ROTATION OF DRILL
COLUMNS INTO RECIPROCATING MOTIONS OF A CUTTER
Filed Sept. 8, 1925    5 Sheets-Sheet 5

INVENTOR:
JOHN A. ZUBLIN,
BY
Ford W. Harris
ATTORNEY.

Patented Feb. 19, 1929.

1,702,757

UNITED STATES PATENT OFFICE.

JOHN A. ZUBLIN, OF LOS ANGELES, CALIFORNIA, ASSIGNOR TO UNIVERSAL ENGINEERING COMPANY, OF LOS ANGELES, CALIFORNIA, A CORPORATION OF CALIFORNIA.

APPARATUS FOR TRANSFORMING CONTINUOUS ROTATION OF DRILL COLUMNS INTO RECIPROCATING MOTIONS OF A CUTTER.

Application filed September 8, 1925. Serial No. 54,876.

My invention relates to the art of drilling wells. It has long been the practice of men to obtain certain minerals by drilling. The drilling of wells to obtain oil has developed into one of the greatest industries in the world.

The modern methods of well drilling may be divided into two general classes; namely, methods employing reciprocating cutters known as cable tools, and methods employing rotating cutters known as rotary tools. Each of these methods has its advantages in certain formations, the reciprocating method having advantages over the rotary method in hard formation such as rock, and the rotating method having advantages over the reciprocating method in the softer formations. It follows then that when drilling by the reciprocating method and soft formations are encountered, drilling will be greatly slowed up because of the fact that the reciprocating tools are not adapted for cutting in this character of material. Also, when drilling by the rotating cutter method and hard materials are encountered, drilling will be slowed up because rotary tools are not adapted for cutting such materials.

It is an object of my invention to provide a means whereby an apparatus for drilling a well by the rotary system may be readily and effectively converted into a reciprocating apparatus. By virtue of my invention, when different substances are encountered, the apparatus may be quickly transformed into a suitable type of apparatus. When drilling through soft materials, a rotating cutter may be employed, and when drilling through hard materials, a reciprocating cutter may be employed.

It is another object of my invention to provide a means for transforming a rotary motion of a drill column into a reciprocating motion of a cutter. My invention employs a drill body of special form, a cutter designed for reciprocating cutting, and a reciprocating means or member for securing the cutter to the body and for reciprocating the cutter when the body which rotates with the drill column is rotated.

It is another object of my invention to provide an apparatus as previously mentioned in which the cutter will have a rectilinear reciprocating motion.

It is also an object of my invention to provide an apparatus as previously mentioned in which the cutter will have an arcuated reciprocating motion.

It is a still further object of my invention to provide an apparatus of the character mentioned in which a plurality of cutters are employed.

It is a further object of my invention to provide an apparatus employing a plurality of cutters in which said cutters are out of phase and impact at different times.

Other objects and the salient advantages of my invention will appear in the following description.

Referring to the five sheets of drawings in which I diagrammatically illustrate various forms of my invention, Fig. 1 is a diagrammatic view illustrating the utility of my invention, this view showing my invention employed at the lower end of a rotating drill column.

Fig. 4 is a view at right angles to Fig. 3 taken as indicated by the arrow 4 of Fig. 3.

Fig. 5 is a cross sectional view taken on the line 5—5 of Fig. 4.

Fig. 9 is an elevational view of a bit having a plurality of cutters having a rectilinear reciprocating motion. This type of bit operates on the same principle as the bit shown in Figs. 2 to 8, inclusive.

Fig. 10 is a section taken on the line 10—10 of Fig. 9.

Fig. 11 is an elevational view of another type of bit having a rectilinear reciprocating motion.

Figure 1:
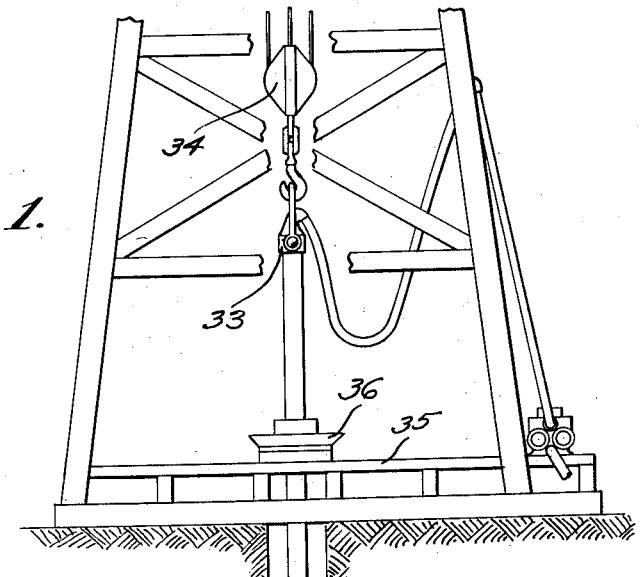

With reference to Fig. 1, I show a bit embodying the features of my invention secured to the lower end of a rotating drill column 31. This drill column 31 extends upwardly through a well 32 and has a swivel head 33 attached to the upper end thereof. The column 31 is supported by a travelling block 34 which attaches to the swivel head 33. On the floor of a derrick 35 is a rotary machine 36 through which the upper end of the drill column 31 extends. The rotary machine 36 imparts rotation to the drill column 31.

The bit 30 is shown in detail in Figs. 2 to 8, inclusive. The bit 30 is provided in the form of a body 40. At the lower end of the body 40 is an eccentric portion 41 having an inclined opening 42 formed therein. The opening 42 extends on an axis 43 which is at an angle with the axis of rotation 44 of the body 40 and of the drill column 31. A pin 46 of a reciprocator 47 extends through the opening 42 and is secured in place by a collar 48. A body 49 of the reciprocator 47 from which the pin 46 extends rests below an inclined face 51 of the body 40. The face 51 is in a plane at right angles to the axis 43 of the pin 46. Suitable bearing means such as ball bearings 52 are provided between the face 51 and an upper face 53 of the body 49. Below the body 49 is a cutter 54, this cutter 54 being associated with the reciprocator 47 by means of a universal joint 55. The universal joint 55 may be of any suitable form such as a ball 56 formed on the reciprocator 47, and a socket 57 provided by the cutter 54. The cutter 54 may be of any shape, the one shown in the drawings having four blades 60 which are pointed at the end 61 thereof, as clearly shown in Fig. 5.

Figure 2:
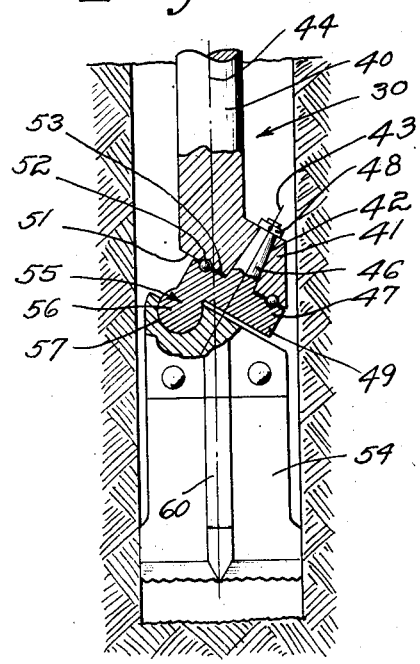
Fig. 2 is a view partially sectioned showing one form of my invention, this view showing a cutter having a rectilinear reciprocating motion, and showing the cutter at the upper end of its structure.
Figure 3:
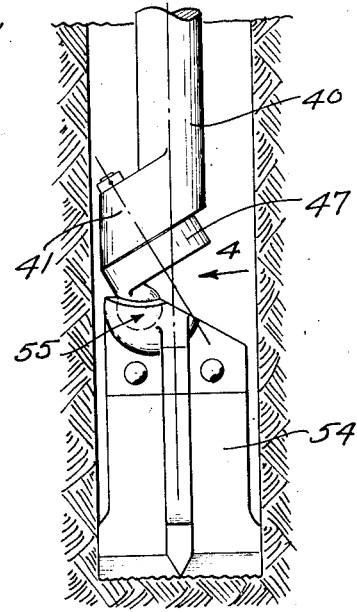
Fig. 3 is a view similar to Fig. 2, but showing the cutter at the lower end of its structure.

When the drill column 31 is rotated, the body 40 of the bit 30 rotates therewith and moves the cutter 54 from elevated position, shown in Fig. 2, into depressed position, shown in Fig. 3. At the end of a complete revolution, the cutter 54 is returned to elevated position as shown in Fig. 2. It follows then that with one revolution of the drill column, the cutter 54 impacts the bottom of the hole being drilled once. In order that the cutter 54 be entirely reciprocated and not rotated, it is necessary that the friction on the sides of the blades 60 of the cutters be greater than the friction between the actuator and the body 40. By providing the bearings 52 and by pointing the ends 61 of the blades 60, the desired ratio of friction may be obtained.

During rotation of the body 40, the reciprocator 47 follows a peculiar path, wobbling considerably, but being restrained from rotation by engagement between the ball 55 and the socket 57.

Figure 6:
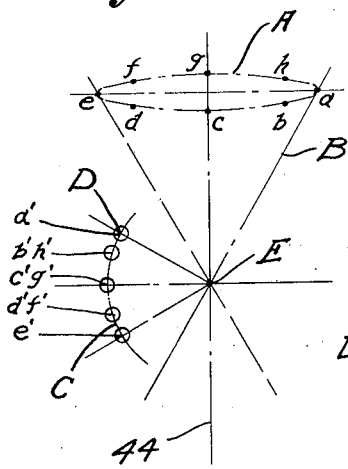
Figs. 6, 7 and 8 are diagrams clearly illustrating movements of the bits of my invention and the positions of these bits throughout a revolution of the drill column.
Figure 7:
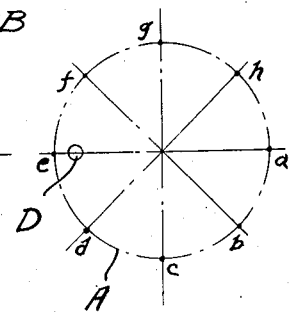
Figure 8:
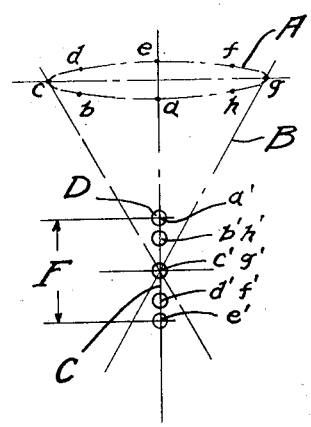

To clearly illustrate motions of these parts, reference is directed to Figs. 6, 7 and 8 of the drawings. In these figures, A is a circle representing a cycle of the bit; B represents the center line of the reciprocator 47, and C represents the travel of any point on the reciprocator B during a cycle of the bit, C being considered as being a travel of the center D of the ball 56 of the universal joint 55. At the start of the cycle, the bit is in the position shown in Fig. 2. The center line B extends through a point $a$ on the circle A, and extends through an axis of rotation 44 of the body 40 of the bit at E. The point D at this time is in the position $a'$. As the body rotates, the axis B of the reciprocator 47 moves around the circle A through points $b$, $c$, $d$, $e$, $f$, $g$ and $h$, the axis extending in all its positions through the point E of the axis 44. During this cycle of revolution, the point D moves along the line of travel C, moving through points $b'$, $c'$, $d'$, $e'$, and back to original position through points $f'$, $g'$ and $h'$. From these diagrams, it will be seen that the point D moves through an arcuated path indicated by C in a vertical plane, as shown in Fig. 6. A distance of travel of the point D, and consequently the travel of the cutter 54 is represented by the distance F, which is the distance between the point $a'$ and the point $e'$ on the line of travel C.

In Figs. 9 and 10, I show the body of the bit shown in Figs. 2 to 8, inclusive, applied to a bit having a plurality of cutters. With reference to Figs. 9 and 10, this bit 65 has a body 66 having an eccentric portion 67. A pin 68 of an actuator 69 extends through an opening 70 in the eccentric portion 67, the reciprocator 69 being on an axis 71 which is at angles, as shown, with the axis of rotation 13

72 of the body 69. On a body 73 of the reciprocator 69 is formed a ball 74 and a ball 75 which extends into a socket 76 and a socket 77, respectively, of a cutter 78 and a cutter 79, respectively. The outer edges 80 of the cutters 78 and 79 are pointed, as shown in Fig. 10. The cutters 78 and 79 are shown as having engaging shoulders 82 and 83 for retaining said cutters in alignment.

In Fig. 9 it will be seen that the cutter 78 is in elevated position, and the cutter 79 is in depressed position. When the cutter 78 is in depressed position, the cutter 79 is in elevated position. The operation of each of these cutters is the same as the operation of the cutter 54 of the first modification of my invention. In the modification shown in Figs. 9 and 10, there will be two impacts by the bit against the body of the hole being drilled, in place of the one impact as in the case of the bit 30.

In Fig. 11 I show a bit 86, this bit showing another construction of my invention. The bit 86 has a body 87 having an eccentric formation 88 formed at the lower end thereof. Below the body 78 is a rectilinear reciprocating cutter 90 having blades 91. An actuator 92 is provided for connecting the body and cutter together, and for reciprocating the cutter when the body rotates. The actuator has a ball 93 formed at the upper end thereof which extends into a socket 94 of the body 87, and has a ball 95 formed at the lower end thereof which rests in a socket 96 of the cutter 90. The cutter in Fig. 11 is shown in elevated position. When the body rotates half a revolution, the actuator is brought into an approach of the vertical position, and the cutter will be in depressed position. In other words, when the reciprocator is at its smallest angle with the axis of rotation of the body 87, the cutter 90 is in depressed position, and when the actuator 92 is at its greatest angle with the axis of rotation of the body 87, the cutter 90 is in elevated position.

The bits 30, 65 and 86 all have rectilinear reciprocating cutters and operate substantially upon the same principle. These cutters produce a hole which is substantially the same size and shape as the blades or the cutters of the bits. These bits may be employed to drill a short distance after which the hole is reamed to proper shape, or to substantially circular shape as indicated in certain of the figures in the drawings.

Figure 12:
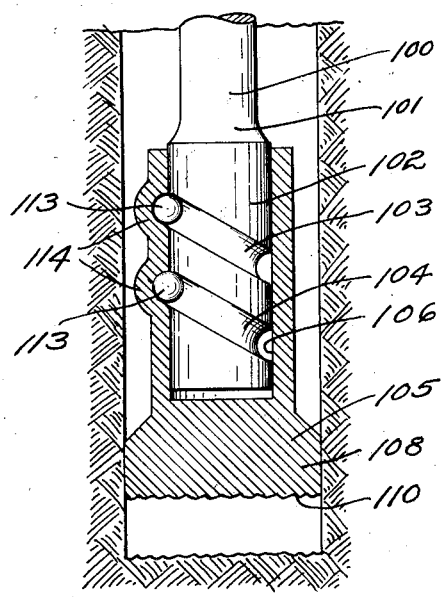
Fig. 12 is a sectional view of another modification of my bit, the cutter of said bit having a rectilinear reciprocating motion, the method of reciprocating the cutter in this modification of my invention being different from the methods of the bit shown in the previous figures.
Figure 13:
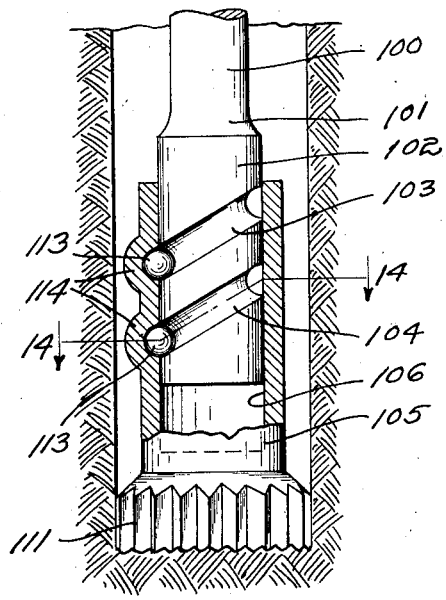
Fig. 13 is a sectional view of a bit shown in Fig. 12, the cutter of this bit being shown at the lower end of the stroke.
Figure 14:
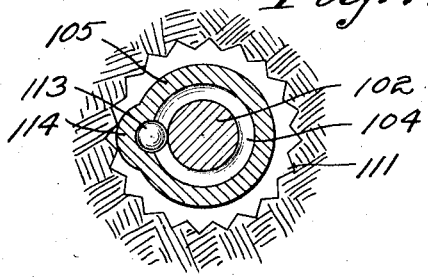
Fig. 14 is a cross section taken on the line 14—14 of Fig. 13.

In Figs. 12, 13 and 14 I show a bit 100 having a cutter possessed of rectilinear reciprocating motion. The bit 100, however, employs a different principle of operation from the bits shown in the previous figures of the drawings.

With reference to Figs. 12 to 14, inclusive, the bit 100 has a rotatable body 101 having a cylindrical formation 102 at the lower end thereof. Races 103 and 104 are cut into cylindrical formation 102, these races being formed on inclined planes, as clearly shown in these figures. A cutter 105 has a cavity 106 into which the cylindrical formation 102 extends. The lower end of the cutter 105 is enlarged at 108 and is provided with suitable teeth 110 at the bottom, and suitable teeth 111 at the periphery thereof. Balls 113 are carried in sockets 114 of the cutter 105, one of these balls 113 resting in the race 103 and one ball resting in the race 104. When the bit 100 is in the position shown in Fig. 12, the balls 113 rest in the extreme upper portions of the inclined races 103 and 104, and the cutter 105 is retained in elevated position. At half a revolution of the body 101, the cutter 105 is moved into depressed position, as shown in Fig. 13. When the body 101 moves half a revolution, the extreme lower ends of the inclined races 103 and 104 move into adjacency of the balls 113. When the body rotates, the balls 113 are caused to follow along the ball races 103 and 104, thus moving the cutter 105 from elevated to depressed position. The teeth 111 on the periphery of the cutter 105 provide sufficient friction to prevent the cutter from rotating. For this reason, the cutter 105 will have entirely a rectilinear reciprocating motion, whereas the body 100 will have entirely a rotating motion.

Figure 15:
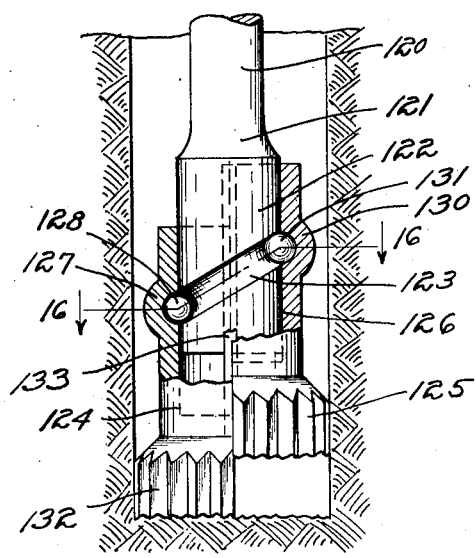
Fig. 15 is a sectional view showing a bit having a plurality of cutters, the principle of operation and construction of this bit being the same as the bit shown in Figs. 12 to 14, inclusive.
Figure 16:
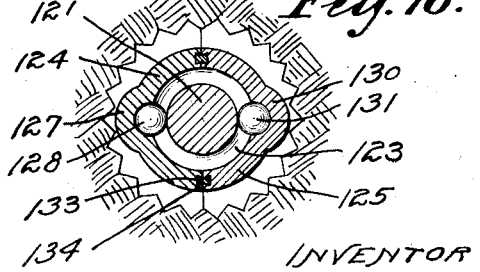
Fig. 16 is a cross sectional view taken on the line 16—16 of Fig. 15.
Figure 17:
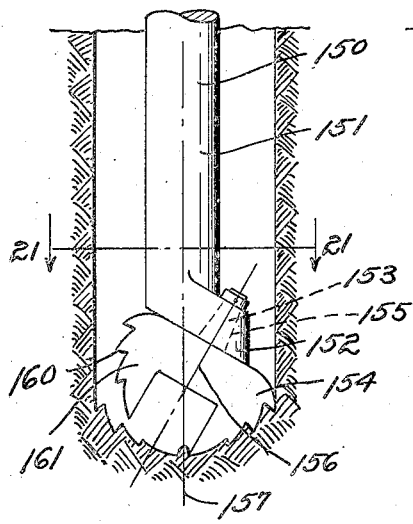
Fig. 17 is an elevational view of a bit having a cutter which has an arcuated reciprocating motion.
Figure 19:
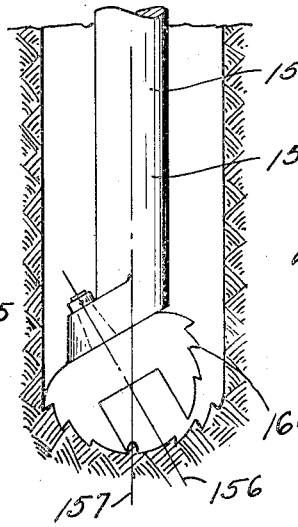
Fig. 19 is a view of the bit shown in Figs. 17 and 18, this view showing the position of the parts of the bit at half a revolution.
Figure 18:
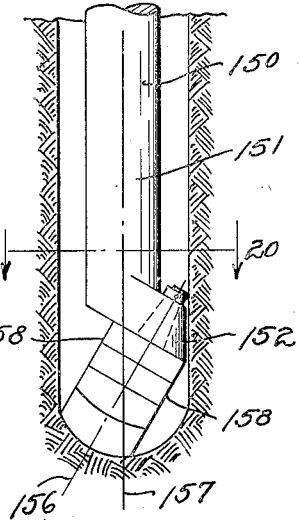
Fig. 18 is a view of this bit illustrating the position of the parts when the bit has rotated a quarter of a revolution.

In Figs. 15 and 16, I show a bit 120 having a plurality of cutters. The bit 120 operates on the same principle as the bit 100 shown in Figs. 12 to 13. With reference to Figs. 15 and 16, the bit 120 has a body 121 providing a cylindrical formation 122 at the lower end thereof. An inclined ball race 123 is formed on the plane shown clearly in Fig. 15. A pair of cutters 124 and 125 cooperate to provide a cavity 126 into which the cylindrical formation 122 of the body 121 extends. The cutter 124 has a socket 127 retaining a ball 128 and the cutter 125 has a socket 130 retaining a ball 131, these balls 128 and 131 resting in the inclined ball race 123. The cutters 124 and 125 have bottom teeth and peripheral teeth 132. Securing members of any character such as indicated at 133 in Fig. 16 are provided between abutting faces 134 of the cutters 124 and 125 for securing them together. This securing arrangement, however, must allow a relative movement between the cutters 124 and 125. The balls 128 and 131 being on opposite sides of the body 121 rest in the lowermost and uppermost portions of the race 122, respectively. For this reason the cutter 124 is in depressed position, and the cutter 125 is in elevated position. When the body 121 revolves half a revolution, the upper end of the race 123 moves to the opposite side, causing the ball 128 to move upwardly and causing the cutter 124 to move into elevated position; likewise, the lower end of the race 123 moves into the adjacency of the ball 131, causing the ball to move downwardly, and the cutter 125 to move into depressed position. The teeth 131 provide sufficient friction to prevent the cutters 124 and 125 from rotating. These cutters have entirely a rectilinear reciprocating motion, whereas the body 121 has a rotating motion.

In this modification of my invention, there will be two impacts for every rotation of the body 121. It is obvious that any number of cutters to acquire any number of impacts per revolution may be had by cutting a complete cutter as shown at 105 in Figs. 12 to 14, inclusive, into the desired number of segments, thus providing a number of segmental cutters.

In Figs. 17 to 20, inclusive, I show a modification of my invention which is slightly different from other modifications shown. In these figures I show a bit 150 which transforms a rotating motion of the drill column into arcuated reciprocating motion of a cutter in place of transforming a rotary motion of the drill column into a rectilinear reciprocating motion of the cutter. With reference to these figures, the bit 150 has a body 151 having an eccentric formation 152. A pin 153 of a cutter 154 extends through an eccentrically disposed opening 155 formed in the eccentric formation 152. This opening 155 extends on an axis 156 which is at angles with respect to the axis of rotation 157 of the body 151 of the bit 150. The cutter 154 has a cutter portion 157 which is situated symmetrically on the axis 156. The shape of the cutter portion 157 is slightly oblong, as shown, having parallel flat sides 158 and curved ends 159. The curved ends 159 are provided with teeth 160, as shown. When the body moves from the position shown in Fig. 17 into the position shown in Fig. 19, the body is swung an angular distance equal to twice the angle of the axis 156 with the axis of rotation 157. The cutter 154 returns to the position shown in Fig. 17 at a complete revolution of the body 151 and has travelled through a complete reciprocation.

Figure 21:
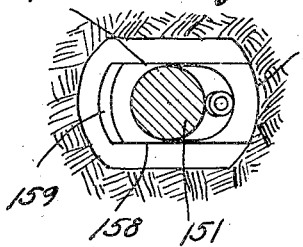
Fig. 21 is a cross sectional view taken on the line 21—21 of Fig. 17.
Figure 20:
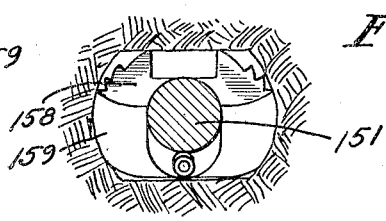
Fig. 20 is a cross sectional view taken on the line 20—20 of Fig. 18.

It is evident that the cutter 154 follows an arcuated reciprocation during a revolution of the body 15. The shape of the cutter portion 157 being oblong provides friction which prevents it from rotating with the body 151. The cutter moves through a wobbling reciprocating motion. At a quarter of a revolution, the cutter moves into the position shown in Fig. 18. The shape of the hole cut by a cutter of this character is of substantially the same shape as the cross section of the cutter, but is somewhat larger, as shown in Figs. 20 and 21. In this type of bit shown in Figs. 17 to 21, the cutter 156 is attached directly to the body 151, eliminating a reciprocating means as previously necessary, this change in construction tending to account for the different mode of reciprocation, namely, arcuated reciprocation.

Figure 22:
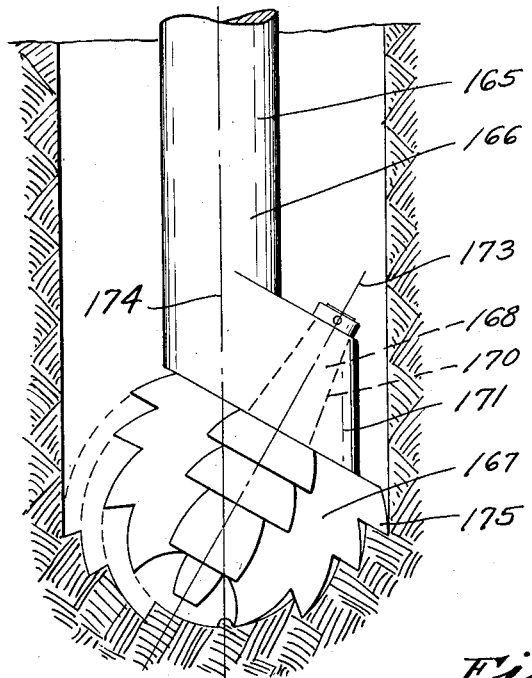
Fig. 22 is an elevational view of a bit having a round cutter which has an arcuated reciprocating motion.

Owing to the fact that an arcuated reciprocating cutter cuts the same shape of hole as the shape of the cutter, a round hole may be produced by providing a round cutter. In Fig. 22 I show a bit 165 having a body 166 to which there is secured a cutter 167 which is round. This cutter 167 has a pin 168 extending through an opening 170 in an eccentric formation 171 of the body 166. The cutter 167 is on an axis 173 which is at angles with respect to the axis of rotation 174 of the body 166. When the body 166 is reciprocated, the teeth 175 of the cutter 167 engage the bottom of the hole, cutting it away. The cutter of this bit 165 will have an angular reciprocating motion. However, due to the fact that the cutter is round, the friction on the side thereof is not sufficient to entirely keep the cutter from rotating, and there will be a very minute tendency for rotation in the cutter. This is, however, a negligible amount.

From the foregoing description, it is evident that my invention effectively accomplishes a transformation of rotating motion into reciprocating motion, and it is obvious that various forms of constructions may be made to accomplish this transformation. By virtue of my invention, a rotary drilling outfit may be readily supplied with a reciprocating cutter which may be employed when rock formations are encountered. At present, in rotary apparatus the rotary cutters must be used at all times. When hard rock is encountered, the drilling is very slow and the wear upon the cutters is very great. For this reason, when drilling through rock, the cost of operation is very expensive. With my invention, when rock is encountered, the drill column is elevated to the surface, and the rotary bit is replaced by a bit of my invention which is employed until the rock formation has been penetrated, after which the rotary bit may again be placed on the drill column for use.

Although I have shown various forms of my invention, it should be clearly understood that various modifications and various other constructions may be made without departing from the spirit and scope of my invention which should be construed entirely by the appended claims.

I claim as my invention:

1. In combination: a rotatable member; a reciprocable member; means non-rigidly connected to said rotatable member and said reciprocable member for bodily reciprocating said reciprocable member when said rotatable member rotates; and means for restraining said reciprocable member from rotation.

2. In a drilling apparatus, the combination of: a drill column adapted to be extended into a well; a cutter; and a reciprocator, said reciprocator being flexibly attached to said cutter and to said drill column and reciprocating said cutter bodily when said drill column rotates.

3. In a drilling apparatus, the combination of: a drill column pipe adapted to extend into a well; mechanism near the top of said well for rotating said drill column; a reciprocator journaled at the lower end of said drill column on an axis at an angle with the axis of said drill column; and a reciprocable cutter non-rigidly connected to said reciprocator, said reciprocable cutter being reciprocated bodily by said reciprocator when said drill column rotates.

4. In a drilling apparatus, the combination of: a drill column pipe adapted to extend into a well; mechanism near the top of said well for rotating said drill column; a reciprocator journaled at the lower end of said drill column on an axis at an angle with the axis of said drill column; and a plurality of reciprocable cutters non-rigidly connected to said reciprocator, said plurality of reciprocable cutters being reciprocated bodily by said reciprocator when said drill column rotates.

5. In a drilling apparatus, the combination of: a drill column pipe adapted to extend into a well; mechanism near the top of said well for rotating said drill column; a reciprocator journaled at the lower end of said drill column on an axis at an angle with the axis of said drill column; and a plurality of reciprocable cutters non-rigidly connected to said reciprocator, said plurality of reciprocable cutters being reciprocated bodily by said reciprocator when said drill column rotates, said reciprocable cutters being reciprocated out of phase.

6. A combination as defined in claim 3 characterized by the fact that said reciprocable cutter has faces adapted to engage the wall of said well to restrain said reciprocable cutter from rotation.

7. In a drilling apparatus, the combination of: a rotatable drill column adapted to be extended into a well; an impact cutter bodily reciprocable in the bottom of said well; and a member non-rigidly connected to said drill column and non-rigidly connected to said cutter whereby rotation of said column bodily reciprocates said cutter.

8. In a drilling apparatus, the combination of: a rotatable drill column adapted to be extended into a well; an impact cutter bodily reciprocable in the bottom of said well; and a member rotatably connected by said drill column and non-rigidly connected to said cutter whereby rotation of said column bodily reciprocates said cutter.

9. In a drilling apparatus, the combination of: a rotatable drill column adapted to be extended into a well; a gyrating member mounted on said column to gyrate as said column rotates; and an impact cutter non-rigidly connected to said gyrating member and reciprocated vertically thereby.

In testimony whereof, I have hereunto set my hand at Los Angeles, California, this 2nd day of September, 1925.

JOHN A. ZUBLIN.